FIG. 1
FIG. 2
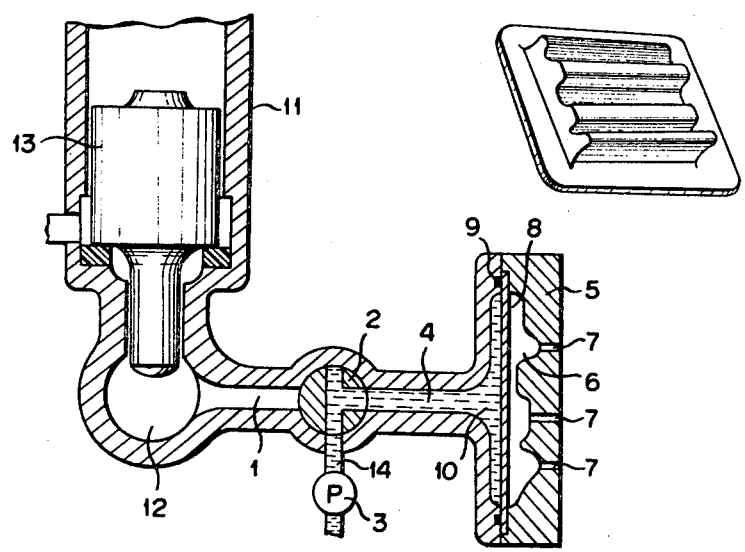
FIG. 3
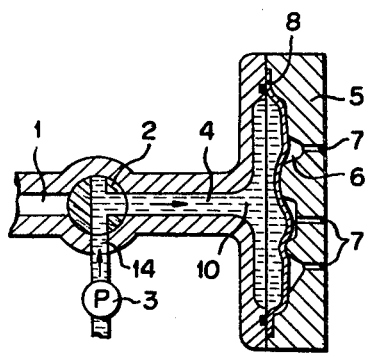
FIG. 4
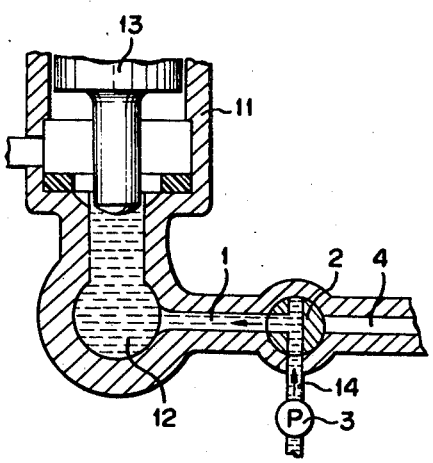
INVENTOR.
HIROSHI TOMINAGA
BY MASANOBU TAKAMATSU

INVENTOR.
HIROSHI TOMINAGA
MASANOBU TAKAMATSU

FIG. 12
FIG. 13
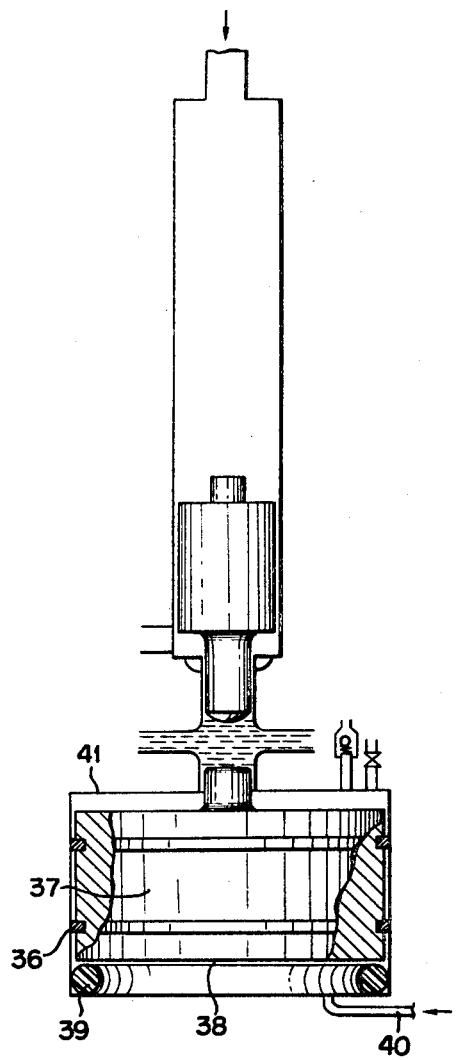
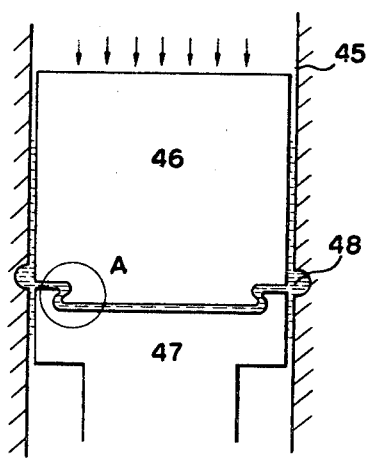

United States Patent Office 3,494,160
Patented Feb. 10, 1970

3,494,160
APPARATUS FOR FORMING A MATERIAL BY MEANS OF IMPULSIVE LIQUID PRESSURE
Hiroshi Tominaga and Masanobu Takamatsu, Yokohama-shi, Japan, assignors to Tokyu Sharyo Seizo Kabushiki Kaisha, Yokohama-shi, Kanagawa-ken, Japan
Filed June 23, 1967, Ser. No. 648,391
Claims priority, application Japan, June 24, 1966, 41/40,690; Sept. 5, 1966, 41/58,265, 41/58,266
Int. Cl. B21d 26/04
U.S. Cl. 72—60    5 Claims

ABSTRACT OF THE DISCLOSURE

In two-stage forming for a material such as sheet metal, the hydraulic pressure at the first stage for forming the material roughly is generated by means of a hydraulic pump while the pressure at the second stage for forming the material precisely is generated with the aid of an impulsive liquid pressure generating device. According to the present disclosure, the hydraulic pump may serve to supply the impulsive liquid pressure generating device with the liquid in combination with a change-over valve.

Detailed description

The present invention relates to an apparatus for forming a material by means of impulsive liquid pressure, and more particularly to an apparatus for forming a material by means of hydraulic pressure for which a two-stage pressurizing system using a hydraulic pump and an apparatus for generating impulsive liquid pressure is employed.

Generally, in forming the material by means of hydraulic pressure, the volume of deformation at the first stage wherein the material is formed largely and roughly in conformity with the cavity of a mold is larger, and the hydraulic pressure required is relatively low. At the second stage wherein the material is formed precisely in conformity with the cavity and thus perfectly formed, the volume of deformation is relatively small, and the hydraulic pressure required is large. A pump, when used for generating hydraulic pressure, can supply a relatively large quantity of water and therefore can deal with a large volume of deformation, but cannot generate a very high hydraulic pressure. On the other hand an apparatus for generating impulsive liquid pressure can generate easily a very high pressure, but can supply only a restricted quantity of water for its structural reason.

Accordingly, it is an object of the present invention to provide an apparatus for forming on the basis of two-stage pressurizing system, and which does not have the above mentioned disadvantages. The apparatus according to the present invention enables a material to be formed continuously as well as efficiently into such a complicated shape as cannot be given only by a hydraulic pump. Further it will be possible to manufacture a product of large volume by means of an apparatus for generating impulsive liquid pressure of relatively small capacity. A water pump can be used as both a water supply device for the impulsive liquid pressure generating apparatus and the pressurizing device at the first stage with the aid of a change-over valve.

Another object of the present invention is to provide an apparatus for generating impulsive liquid pressure in which a momentum of a hammer may be perfectly balanced. The apparatus according to the present invention has advantages of simple construction and easy operation. Moreover the balance can always be maintained with variation in air pressure while an additional energy is not required for carrying out this balance, and all energy can be effectively utilized for generation of hydraulic pressure.

A further object of the present invention is to provide an apparatus for generating impulsive liquid pressure having a buffer action. The apparatus according to the present invention is not subjected to a large acceleration so that an impulsive vibration transmitted to the foundation of a large-sized apparatus can be kept small.

Other objects and advantages of the invention will be apparent from the following description taken in connection with the accompanying drawings, in which:

FIG. 1 is a longitudinal sectional view of an apparatus for forming a material plate by means of impulsive liquid pressure;

FIG. 2 is a perspective view of the product made by said apparatus;

FIGS. 3 to 5 are longitudinal sectional views of the apparatus in the process of forming;

FIGS. 11 and 12 illustrate a further embodiment of the invention for generating impulsive liquid pressure to be used for the apparatus of the present invention in a state just before liquid pressure is generated and in a state just after liquid pressure is generated;

FIG. 13 is a longitudinal sectional view of a sound-proof system to be used for the apparatus according to the present invention;

FIGS. 15I to IV illustrate different positions of both the hammer and piston in impact motion and states of oil film.

Figure 8:
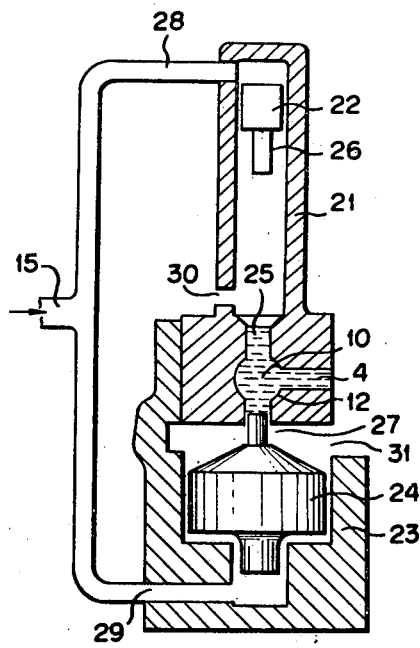
FIG. 8 is a schematic longitudinal sectional view of another apparatus for generating impulsive liquid pressure to be used for the forming apparatus.
Figure 10:
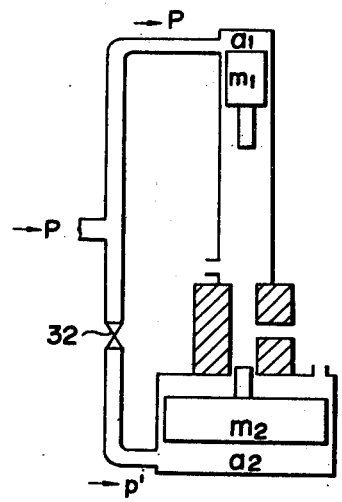
FIG. 10 is a longitudinal sectional view illustrating a modification of the apparatus shown in FIG. 8.
Figure 11:
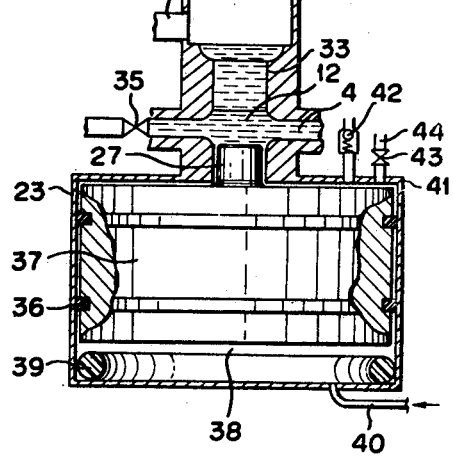

Referring now to FIG. 1, 1 denotes a channel communicated with a hydraulic pressure chamber 12 of an apparatus 11 for generating impulsive liquid pressure as shown in FIGS. 8, 10 and 11; 2 a pressure-tight change-over valve for changing the channels such as a rotary valve or a slide valve; 3 a water pump such as a gear pump or a plunger pump which can generate a hydraulic pressure of about 100 to 200 atms. The pump has functions of supplying water to the apparatus 11 for generating impulsive liquid pressure and of generating the hydraulic pressure. 4 denotes a channel leading to a mold 5 for forming the material in which there are provided a cavity 6 for forming and an air hole 7 in communication with the open air. 8 denotes a material to be formed, for example, a sheet metal, and 9 a packing which serves to prevent the water 10 in contact with the material 8 from leaking.

The operation of the apparatus according to the present invention will be described hereinafter: As shown in FIG. 1, the channel 1 is closed by the change-over valve 2, and the pump 3 is connected to the channel 4. The material 8 is put in the mold 5 which is tightly closed and filled with water 10 in contact with the material 8. Air bubbles in water may be previously removed. When the pressure of water 10 is raised by the pump 3, the material 8 is gradually deformed toward the mold 5 due to hydraulic pressure and formed roughly in conformity with the cavity 6. However, it is impossible by such a hydraulic pressure of about 100 to 200 atms. which can be readily generated by the pump 3 that the material 8 may be formed following the shape of the cavity 6 of the mold 5, with the exception that the plate to be formed is considerably thin. Therefore it is necessary to perform further forming in detail by a stronger hydraulic pressure. The working stage is shown in FIG. 3.

Figure 5:
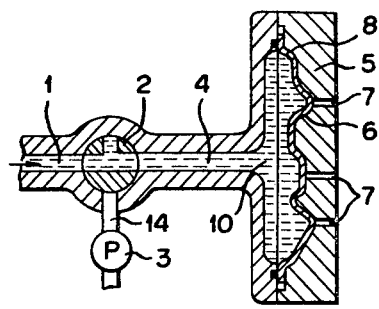

Subsequently to this, when the channel 4 is closed by the change-over valve 2 and the pump 3 is communicated with the channel 1 as shown in FIG. 4, a hydraulic pressure chamber 12 of the apparatus 11 for generating impulsive liquid pressure is filled with water, and a hammer 13 is pushed up. The channel 14 of the pump 3 is then closed by changing the change-over valve 2, and the channel 1 is connected to the channel 4 as shown in FIG. 5. Upon impact against the hammer 13, an impulsive liquid pressure up to several thousand atms. is generated in a moment whereby the material 8 is formed precisely in conformity with the cavity 6, and thus the forming is completed. This condition is shown in FIG. 5 and the product is shown in FIG. 2.

Next, the apparatus 11 for generating impulsive liquid pressure will be described more particularly.

Figure 6:
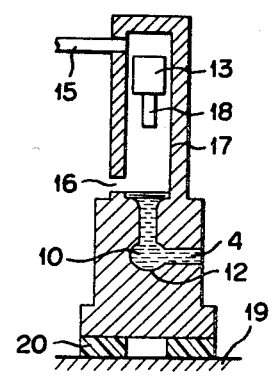
FIG. 6 is a schematic longitudinal sectional view of a known apparatus for generating impulsive liquid pressure which is used for a forming apparatus of this kind.

In a prior apparatus for generating impulsive liquid pressure of this kind as shown in FIG. 6, a cylinder 17 having an inlet 15 of compressed air at its upper part and an opening 16 at its lower part and a hydraulic pressure chamber 12 are formed as one body. A hammer 13 and a plunger 18 integral therewith are provided in the cylinder 17. The hydraulic pressure chamber 12 is communicated with a hydraulic pressure channel 4 and filled with a pressure medium 10 such as water.

Figure 7:
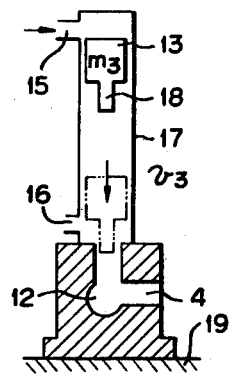
FIG. 7 is a view for explaining the principle of the apparatus in FIG. 6.

In FIG. 7, supposing that the hammer 13 having a mass $m_3$ under acceleration by compressed air rushes at a velocity $V_3$ into the water 10 and generates an impulsive hydraulic pressure, the quantity of work to be transmitted from the hammer 13 to the water 10 is equal to kinetic energy of the hammer, that is $m_3v_3^2/2$. Simultaneously with generation of hydraulic pressure, momentum $m_3v_3$ of the hammer 13 is applied as impact to a foundation 19 through the hydraulic pressure chamber 12. In case the apparatus is not so large-sized, it is preferable to provide a firm foundation 19 and to interpose a shock-absorbing member 20 such as rubber between the apparatus and the foundation for the purpose of reduction in a large vibration transmitted to the foundation, therefore of prevention of the foundation against damage.

Especially, in a large-sized apparatus, it is undesirable that the momentum acts as impact on the foundation 19, because said momentum brings not only the foundation 19 but also the whole apparatus into vibration so that parts to be mounted would become loose with result in failure in their function and decrease in accuracy of the product.

The present invention proposes an apparatus for generating impulsive liquid pressure of momentum balance type having no disadvantages mentioned above. As shown in FIG. 8, the apparatus according to the invention has a small hammer 22 sliding within a small cylinder 21 and a large hammer 24 sliding within a large cylinder 23 opposite to each other through interposition of a hydraulic pressure chamber 12 to which both cylinders are fixed. The hydraulic pressure chamber 12 is formed with a cylindrical bore 25 in which a plunger 26 having a small hammer 22 integral therewith and a plunger 27 having a large hammer 24 are so arranged as to slide in the bore. The hydraulic pressure chamber is filled with a liquid such as water 10. In order to lead an impulsive hydraulic pressure generated to the outside for performing various works the bore 4 is communicated with the bore 25. At respective outer ends of the small cylinder 21 and the large cylinder 23, there are provided ports 28 and 29 leading to an air pipe 15 through which compressed air is sent. At other ends of the cylinders 21 and 23 there are provided openings 30 and 31. Above explanations have been made in connection with the case that water is used as a pressure medium, but another liquid such as glycerin or oil can be used.

Figure 9:
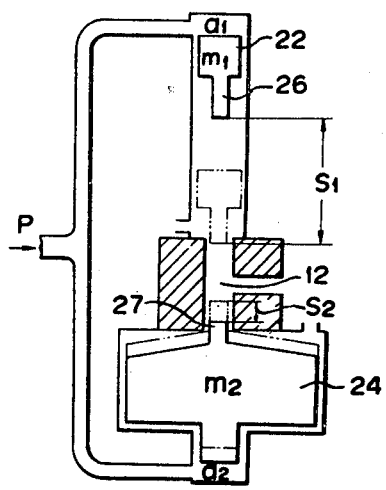
FIG. 9 is a view for explaining the principle of the apparatus in FIG. 8.

Next, in FIG. 9 showing the principle of the apparatus according to the present invention, $m_1$ or $m_2$ represents the mass of the small hammer 22 including the plunger 26 or of the large hammer 24 including the plunger 27; $v_1$ or $v_2$ the velocity of the hammer 22 or 24 just before the plunger 26 or 27 generates an impulsive hydraulic pressure within the hydraulic pressure chamber 12; and $s_1$ or $s_2$ the stroke of the hammer 22 or 24. $a_1$ or $a_2$ represents the area of end face of the small hammer 22 or the large hammer 24 on which air pressure acts; $p$ the pressure of compressed air while $p'$ of FIG. 10 represents air pressure reduced at a certain ratio by means of a reducing valve 32.

At the end of the large hammer 24 subjected to compressed air there is formed a small diameter portion with a step whose diameter is the same as that of the small hammer 22. In the air pipe 15 there is incorporated a valve (not shown in the drawing) for the air flowing into both cylinder 21 and 23 concurrently. In FIG. 10 the air pressure $p$ is reduced to $p'$ by means of the reducing valve 32 and acts on the surface $a_2$. In this case the ratio $p'/p$ is equal to $a_1/a_2$.

When the valve (not shown) in the air pipe 15 is opened, the compressed air flows into both cylinders 21 and 23 so that both the small hammer 22 and the large hammer 24 are accelerated respectively to the velocities of $v_1$ and $v_2$ just before they rush into the hydraulic pressure chamber 12. Consequently the water 10 within said hydraulic pressure chamber is impulsively compressed by the plungers 26 and 27 of the hammers 22 and 24, and thus a high pressure is generated. In order to prevent the water against leaking from the pressure chamber, the plunger 27 is preferably beforehand fitted with a part of its length in the cylindrical bore 25 of the hydraulic pressure chamber 12.

The quantity of energy transmitted from both hammers to the water is $\frac{1}{2}(m_1v_1^2+m_2v_2^2)$ and all the kinetic energy of both hammers is effectively used for compression of the water and thus generation of an impulsive hydraulic pressure. For the balance of both momentum $m_1v_1$ must be equal to $m_2v_2$. Namely, $$\frac{m_1}{m_2}=\frac{v_2}{v_1} \tag{1}$$

In FIGS. 8 and 9, (I) in case each hammer moves at a uniform acceleration owing to a constant air pressure, $$S_1=\frac{v_1t_1}{2} \text{ and } S_2=\frac{v_2t_2}{2} \tag{2}$$

If both hammers have begun to move at the same time and hydraulic pressure is generated with the strokes $S_1$ and $S_2$, $t_1$ becomes equal to $t_2$, and therefore, $$\frac{v_1}{v_2}=\frac{s_1}{s_2} \tag{3}$$

(II) In case the working air pressure varies with time, the acceleration of each hammer $dV/dt$ is not uniform and is the function of time $t$. Namely $$s_1=\int_0^{t_1} v(t)dt$$

and $$s_2=\int_0^{t_2} v(t)dt$$

Actually each stroke is nearly in direct proportion to both the velocity upon impact and the time.

$$s_1 \alpha v_1 t_1, \text{ and } s_2 \alpha v_2 t_2 \tag{2'}$$

When $t_1$ is equal to $t_2$ as mentioned above, $$\frac{v_1}{v_2} = \frac{s_1}{s_2} \qquad (3)$$

In either case of (I) and (II) each hammer is exerted with the force of $pa_1 = pa_2$ for the same time $t_1 = t_2$ so that in accordance with the formula:

Force × Time (Impulse) = Momentum $$pa_1 t_1 = m_1 v_1$$

and $$pa_2 t_2 = m_2 v_2$$

$$pa_1 t_1 = pa_2 t_2 (\because a_1 = a_2, \text{ and } t_1 = t_2)$$

Therefore, $m_1 v_1 = m_2 v_2$.

Thus the momentum of the small hammer is always equal to that of the large hammer, and the necessary condition may be satisfied.

From the above and (3), $$\frac{m_1}{m_2} = \frac{v_2}{v_1} = \frac{s_2}{s_1} \qquad (4)$$

In other words, the object of balance may be attained when the apparatus is so designed that the ratio in mass of the small hammer to the large hammer is equal to reciprocal of the ratio in stroke of the small hammer to the large hammer. And as evident from the above formula, the upward momentum is always equal to that of the downward momentum independently of variation in air pressure $p$.

When the mass of the large hammer 24 is selected much greater than that of the small hammer 22, namely when $m_2 \gg m_2$, the conditions $s_2 \ll s_1$ and $v_2 \ll v_1$ may be obtained. In other words the small hammer having mass $m_1$ moves quickly for a long distance (stroke) while the large hammer having mass $m_2$ moves slowly for a relatively short distance, and the momentums of both hammers are equal to each other so that impact forces to be generated are brought into balance without being transmitted to the outside.

In FIG. 10, the condition $$\frac{p'}{p} = \frac{a_1}{a_2}$$

is always kept by means of the reducing valve 32, and therefore $$a_1 p = a_2 p'$$

On the other hand, $$t_1 = t_2 (\because a_1 t_1 = a_2 p' t_2)$$

Further $$a_1 p t_1 = m_1 v_1 \text{ and } a_2 p' t_2 = m_2 v_2$$

Accordingly, $m_1 v_1 = m_2 v_2$.

Thus the momentum of the small hammer is always equal to that of the large hammer so that the necessary condition is satisfied.

Next, as in FIG. 8 and FIG. 9

$$\frac{v_1}{v_2} = \frac{s_1}{s_2} \qquad (3)$$

Accordingly, $$\frac{m_1}{m_2} = \frac{v_2}{v_1} = \frac{s_2}{s_1} \qquad (4)$$

Namely, the object of balance may also be attained in this case, when design is now made that the ratio in mass of the small hammer to the large hammer is equal to the reciprocal of the ratio in stroke of the small hammer to the large hammer. The upward momentum is always equal to that of the downward momentum as in FIGS. 8 and 9. For the reducing valve for obtaining constant ratio $p'/p$, one on the market is available.

In the explanation stated above, the vertical acceleration of the small or the large hammers is extremely large, and is in the order of several hundred $g$ ($g$ denotes the gravitational acceleration) or several thousand $g$ so that the weight of each hammer is negligible. In case the weight is not negligible, the Formula 4 has only to be amended.

The apparatus for generating impulsive liquid pressure using a buffer system will now be described in connection with FIGS. 11 and 12 in which corresponding parts to those in FIGS. 8 and 9 and are denoted with the same reference numerals. A hammer 22 is slidably fitted in a cylinder 21, and a lower part thereof is made as a plunger 26 movable within a plunger guide 33 which is connected to a hydraulic pressure chamber 12. A change-over valve device 34 serves selectively to introduce compressed air into the cylinder space above the hammer 22, to evacuate it so as to attract that hammer 22 and to connect it with the open air. This valve device consists of several magnet valves, and may be inserted between said cylinder and a compressed air pipe, a vacuum tank, or a pipe in communication with the open air. A port 16 always keeps the cylinder space below the hammer 22 at the atmospheric pressure. The hydraulic pressure chamber 12 is filled with water or other liquid. 35 denotes a water supply valve which is connected to a pressurized water source. An impulsive hydraulic pressure generated in the hydraulic pressure chamber 12 is transmitted to other apparatus for forming or other working (not shown) through a channel 8.

Opposite to the cylinder 21 through interposition of the hydraulic pressure chamber 12 there is arranged a second cylinder 23 in which a piston 37 carrying rings 36 thereon is slidably fitted. At the top of the piston 37 there is formed a plunger 27 which is slidably fitted in the guide 33 of the hydraulic pressure chamber 12. The piston 37 is made heavier than the hammer 22. On the bottom 38 of the second cylinder 23 there is arranged a shock absorbing member 39 such as a rubber ring. A low pressure air pipe 40 opens into the bottom 38 of the second cylinder 23. At the top 41 of the second cylinder 23 there are provided a check valve 42 which permits air only to flow into the cylinder 23 and a throttle valve 43 which communicates the cylinder 23 with the open air.

The movable parts occupy the positions shown in FIG. 11. The hammer 22 is positioned at the upper end of the cylinder 21 because the cylinder space above the hammer 24 is connected to a negative pressure source through the valve device 34, while the piston 37 stays at the top of the second cylinder 23 because a low pressure air supplied through the pipe 40 acts on the bottom of the piston 37 to push it up. At this time, the second plunger 27, fitted in the guide 33 of the hydraulic pressure chamber 12, is at its uppermost position.

After water, supplied to the hydraulic pressure chamber 12 through the then opened valve 35, has filled up the chamber and then flowed over it, the valve is closed. When the valve device 34 is changed over and compressed air having a pressure of about 20 atms. is introduced into the cylinder 21, the hammer 22 is accelerated and rushes with the plunger 26 along the guide 33 so into the water at a high speed so that a high pressure impulsive wave is generated in the hydraulic pressure chamber 12 for working through the passage 4. Under the hydraulic pressure generated in the hydraulic pressure chamber 12, the second plunger 27 or the piston 37 of large weight moves slowly downward. Since the hammer 22 runs at a high speed, for example, of 30 m./s. while the piston 37 moves slowly, the impulsive hydraulic pressure may be effectively used without its generation being disturbed due to the motion of the piston 37.

The ring 36 put on the piston 37 serves to prevent air against leakage and at the same time to decelerate the piston 37 due to friction between it and the second cylinder 23. The piston 37 hits against the shock absorbing member 39 to stop while the shock of the piston is absorbed. In the meantime, the lower end face of the piston 37 is under upward pressure due to the air supplied through the pipe 40. Thus the process of liquid pressure generation is completed. After the hammer 22 is sucked up, a next process is started.

In this case, the check valve 42 is opened during the downward movement of the piston 37 and the space of the second cylinder 23 above the piston 37 remains under the atmospheric pressure. On the other hand the check valve 42 is closed when the piston 37 moves upward by the action of air pressure prevailing in the space below it, and air in the cylinder space above the piston 37 is discharged through the throttle valve 42 so that a back pressure acts on the upper face of the piston 37 due to throttle resistance. Therefore, the piston does not move excessively and suddenly.

If the bottom of the hydraulic pressure chamber 12 is closed, the whole of the apparatus except the hammer 22 would be inevitably subjected to a downward acceleration to vibrate. In the apparatus according to the present invention, there is provided the piston 37 on the lower side of the pressure chamber, and said piston is floated by air pressure which serves as a damping medium. Therefore, a large acceleration is not given directly to the apparatus. All the force given to the bottom face through the shock absorbing member 39 may not be finally avoided but may be reduced sufficiently. A vibratory impact to be applied to the foundation of a large-sized apparatus thus may be sufficiently kept small by that the piston 37 is made heavy compared with the hammer 22 or that the ring 36 is made of a material of relatively large friction resistance or by suitable selection of the shock absorbing member 39 or by selection of the stroke of the piston 37 within the allowable range.

In a pneumatic tool such as air punch which has structural members like a hammer and a piston moving at a high speed therein and which works by air acting impulsively on said structures, intense noises are generated when those movable members hit against one another.

The present invention processes to transmit an impact force to a metallic member through a liquid medium such as oil without direct contact between metal parts in order to prevent noises due to collision of such metal parts from their generation.

In general, when a hammer of the pneumatic tool moves at a high speed under air force in a cylinder and hits at its end directly on an end of a piston, this force is transmitted to a tool connected to the piston whereby work is performed. According to the invention, an end of the hammer and the opposite end of the piston are of special shape, and a tendency that oil at the end of the piston is pushed away by the end of the hammer at the time of impact may be prevented to the utmost so that oil films always exist between both end faces preventing direct contact between solids whereby impact noises between metals may be prevented from generation.

Figure 14:
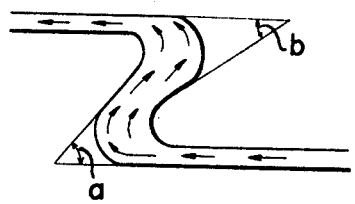
FIG. 14 shows an enlarged portion A of FIG. 13.

The above will be explained in connection with FIGS. 13 to 15: In those figures 45 denotes a cylinder, 46 a hammer, 47 a piston, and 48 an oil basin formed at the inner surface of the cylinder. A tool (not shown) is fitted to the lower part of said piston and performs rivetting, punching, calking, stamping, bending, drawing or other working. According to the present invention, on the end face of the piston 47 there is formed a truncated cone-like recess having chamfered edges as shown by *a*, and on the opposite end face of the hammer 46 there is formed a truncated cone-like projection having chamfered edges as shown by *b*.

Figure 15:
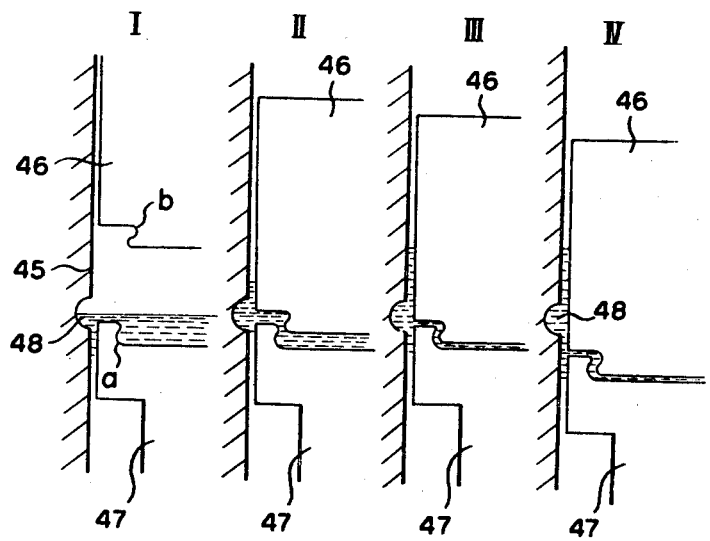

In FIG. 15, each stage I to IV shows the following stage:

(I) The hammer is falling.
(II) The hammer is apraching the piston.
(III) The hammer has begun to hit the piston.
(IV) The hammer has completed its hitting action.

As the hammer approaches the piston, liquid such as oil existing at the end of the piston 47 is pushed away toward the oil basin 48, and the speed of said hammer is very high so that the speed at which the oil is pushed away is very high too. This stream of oil at a high speed goes from the center of the end part of the piston toward its circumference, and is suddenly changed its direction at the portion of *a* in FIG. 14, so that the pressure at this portion becomes high due to jet resistance. In succession, the direction of the stream is suddenly changed likewise at the portion *b* and subjected to resistance so that the flow is disturbed and at the same time the inner pressure of oil rises. If this high instantaneous dynamic pressure balances the pressure between the hammer 46 and the piston 47, oil is not pushed away.

Actually, this phenomenon takes place in quite a short time in the order of milli-second ($1/1000$ sec.), so that hitting motion of the hammer can be completed before all the oil is completely pushed away. The rise in oil pressure at the time of impact is the order of several hundred atms., and this pressure of such order may be brought into balance with a high speed jet resistance due to the curve of oil passage at *a* and *b* in FIG. 14.

For said liquid a lubricating oil is suitable because of high strength (pressure-tightness) of oil film as well as rust-proof effect for the metal used. However it is possible to use other liquid than oil. In this case its noise suppression effect is required. In general a liquid is effective because it absorbs a shock as compared with a solid and does not generate metallic impact sounds.

What is claimed is:

1. Apparatus for forming sheet-like material by hydraulic pressure, comprising, in combination, a first mold part having a cavity with a desired configuration to be imparted to the sheet-like material; a second mold part arranged to clamp the sheet-like material in fluid-tight relation against the first mold part to close one side of said cavity, said second mold part, in conjunction with the sheet-like material, defining a hydraulic fluid receiving chamber having a fluid inlet; a pump supplying a relatively large volume of hydraulic fluid at a relatively low pressure; a hydraulic pulse generator having a second chamber and means operable to subject a relatively small volume of hydraulic fluid in said second chamber to a high pressure pulse; and a change-over valve interposed between said fluid inlet, said pump and said second chamber and operable, in a first position to connect said pump to said fluid receiving chamber to apply a relatively large volume of hydraulic fluid at such relatively low pressure against the sheet-like material to deform the latter roughly into said cavity; said valve having a second position sealing said fluid inlet and connecting said pump to said second chamber to fill the latter with hydraulic fluid, and a third position sealing off said pump and connecting said second chamber to said fluid receiving chamber to subject the hydraulic fluid in contact with the roughly deformed material to a relatively small volume high pressure pulse of hydraulic fluid to deform the roughly deformed material into accurate conformity with the configuration of said cavity.

2. Apparatus for forming sheet-like material by hydraulic pressure, as claimed in claim 1, in which said hydraulic pulse generator comprises first and second relatively small diameter bores, of equal diameter, extending in opposite directions from said second chamber and coaxial with each other; a relatively small diameter first cylinder extending outwardly from said first bore in axial alignment with the latter; a relatively large diameter second cylinder extending outwardly from said second bore in axial alignment therewith; a relatively small mass first hammer slidable in said first cylinder and having a first plunger extending from one end thereof toward said first bore and engageable in fluid-tight relation in said first bore upon movement of said first hammer toward said first bore; a relatively large mass second hammer slidable in said second cylinder and having a relatively small diameter second plunger extending therefrom into said second bore in fluid-tight relation therein; said first bore extending upwardly from said second chamber and said second bore extending downwardly from said second chamber; at least said first cylinder having an opening to atmosphere beneath said first piston; and means operable to supply air under pressure to the opposite ends of said first and second hammers to move at least said first hammer rapidly toward said second chamber to force said first plunger into said first bore to develop said high pressure pulse of hydraulic fluid.

3. Apparatus for forming sheet-like material by hydraulic pressure, as claimed in claim 2, including a check valve connected to said second cylinder above said second hammer and operable to provide for flow of air into said second cylinder upon lowering of said second hammer; and a throttle valve connecting said second cylinder above said second hammer to atmosphere.

4. Apparatus for forming sheet-like material by hydraulic pressure, as claimed in claim 2, in which said second cylinder is formed with an opening to atmosphere above said second hammer; the air under pressure supplied to the opposite end of said second hammer moving said second hammer rapidly toward said second chamber to assist in development of said high pressure pulse of hydraulic fluid; said first and second plungers being integral with said first and second hammers, respectively; the respective masses and strokes of said first and second hammers satisfying the relation $m_1/m_2 = s_1/s_2$, wherein $m_1$ is the mass of said first hammer, $m_2$ is the mass of said second hammer, $s_1$ is the stroke of said first hammer and $s_2$ is the stroke of said second hammer.

5. Apparatus for forming sheet-like material by hydraulic pressure, as claimed in claim 4, including a reducing valve interposed in the supply of air under pressure to the opposite end of said second hammer; in which the relation of the air pressures applied to the opposite ends of said first and second hammers and the areas of said opposite ends subjected to such air pressure satisfy the formula $p'/p = a_1/a_2$, wherein $p$ is the pressure of the air effective on the opposite end of said first cylinder, $p'$ is the pressure of the air effective on the opposite end of said second hammer, $a_1$ is the area of the opposite end of said first hammer subjected to air under pressure and $a_2$ is the area of the opposite end of said second hammer subjected to air under pressure.

References Cited

UNITED STATES PATENTS

| 796,758 | 8/1905 | Philipp | 72—63 |
| 2,615,411 | 10/1952 | Clevenger et al. | 72—60 |
| 3,043,254 | 7/1962 | Heidmann | 29—421 |

RICHARD J. HERBST, Primary Examiner

U.S. Cl. X.R.

9—421